United States Patent

[11] 3,543,635

[72] Inventors Maso Galbarini;
 Francesco Cotta Ramusino, Milan, Italy
[21] Appl. No. 677,980
[22] Filed Oct. 25, 1967
[45] Patented Dec. 1, 1970
[73] Assignee INNOCENTI Societa Generale per
 l'Industria Metallurgica e Meccanica
 Milan, Italy
[32] Priority Aug. 3, 1967
[33] Italy
[31] No. 52665-A/67

[54] INTERNAL MACHINING OF LARGE HOLLOW
 CYLINDRICAL WORKPIECES
 15 Claims, 12 Drawing Figs.
[52] U.S. Cl. ................................................... 90/11; 77/3;
 90/14
[51] Int. Cl. ..................................................... B23c 3/00,
 B23b 39/02

[50] Field of Search .............................................. 90/11, 14,
 171, 15; 77/3; 82/2.4

[56] References Cited
 UNITED STATES PATENTS
 1,852,601  4/1932  Boyer ............................ 90/171
 3,097,568  7/1963  Kampmeier ................... 77/3X
 3,131,584  5/1964  McFerren ...................... 77/3
 3,200,671  8/1965  Porath ........................... 90/14X
 3,404,588  10/1968 Anger ............................ 77/3

Primary Examiner—Gil Weidenfeld
Attorney—Sughrue, Rothwell, Mion, Zinn & MacPeak ABSTRACT: A large hollow cylindrical workpiece is machined internally by milling or reaming tools supported on a tubular member which is itself supported coaxially within the workpiece for axial movement and rotation under control of a headstock connected to one end of the tubular member.

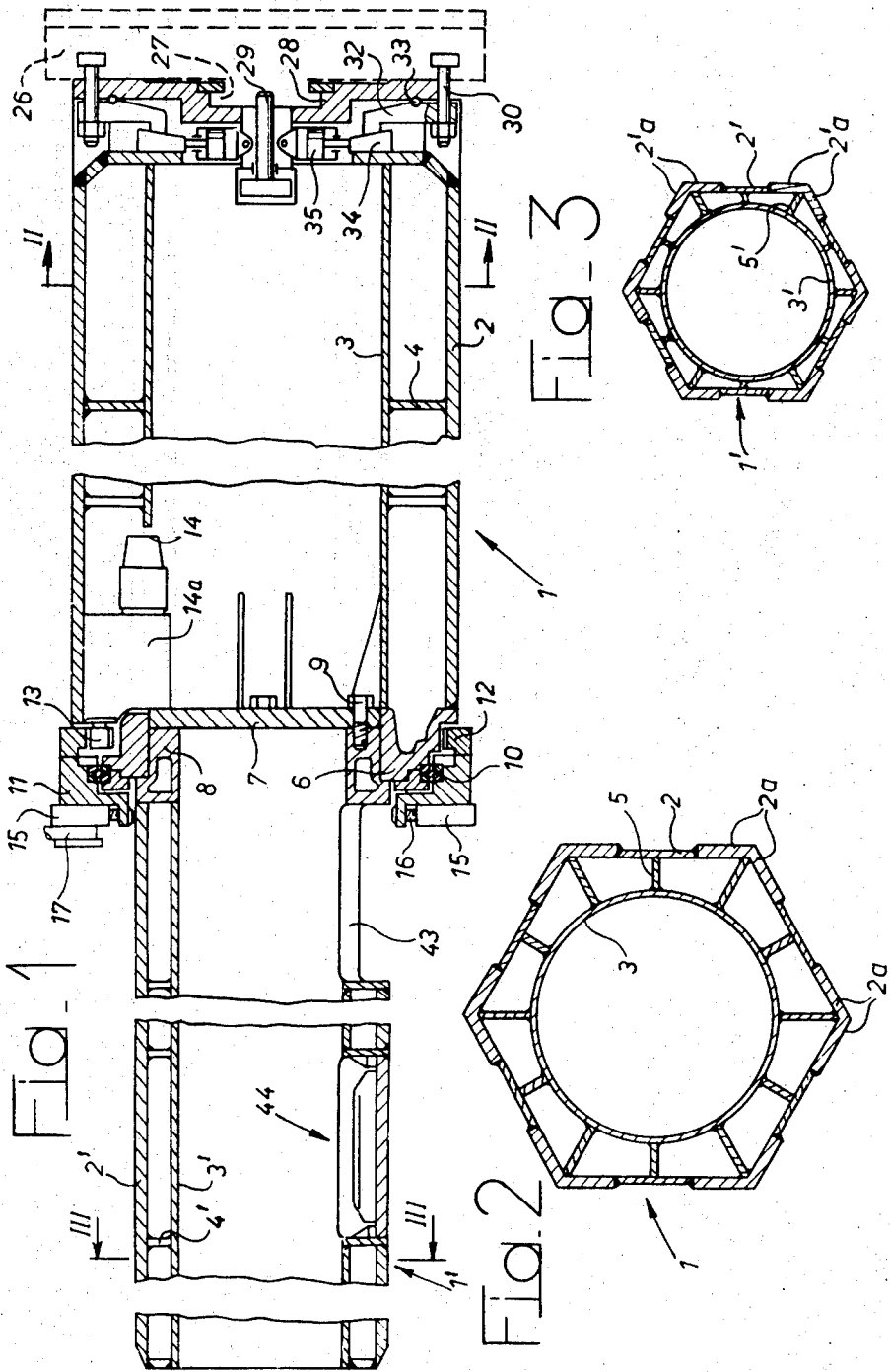

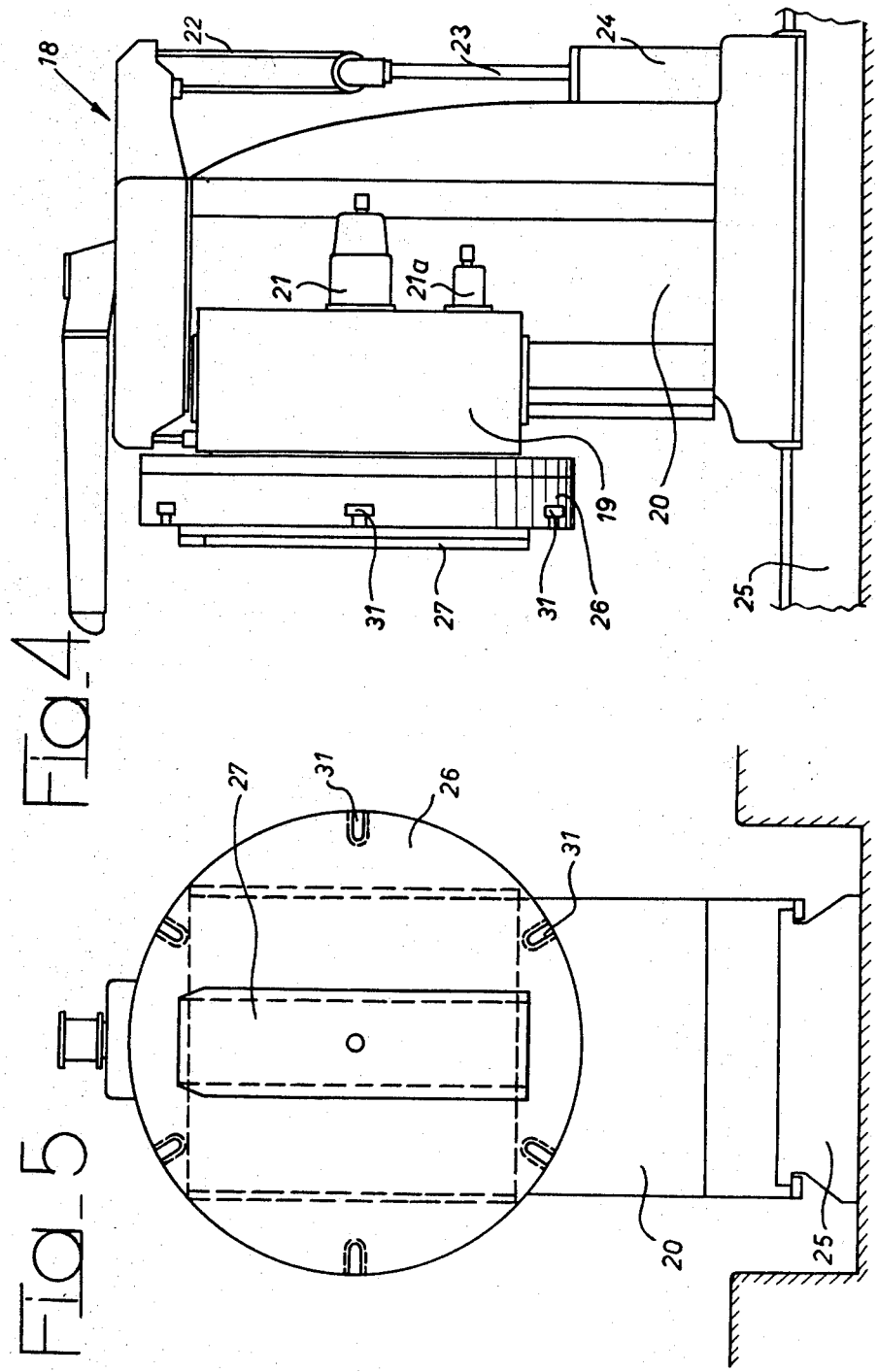

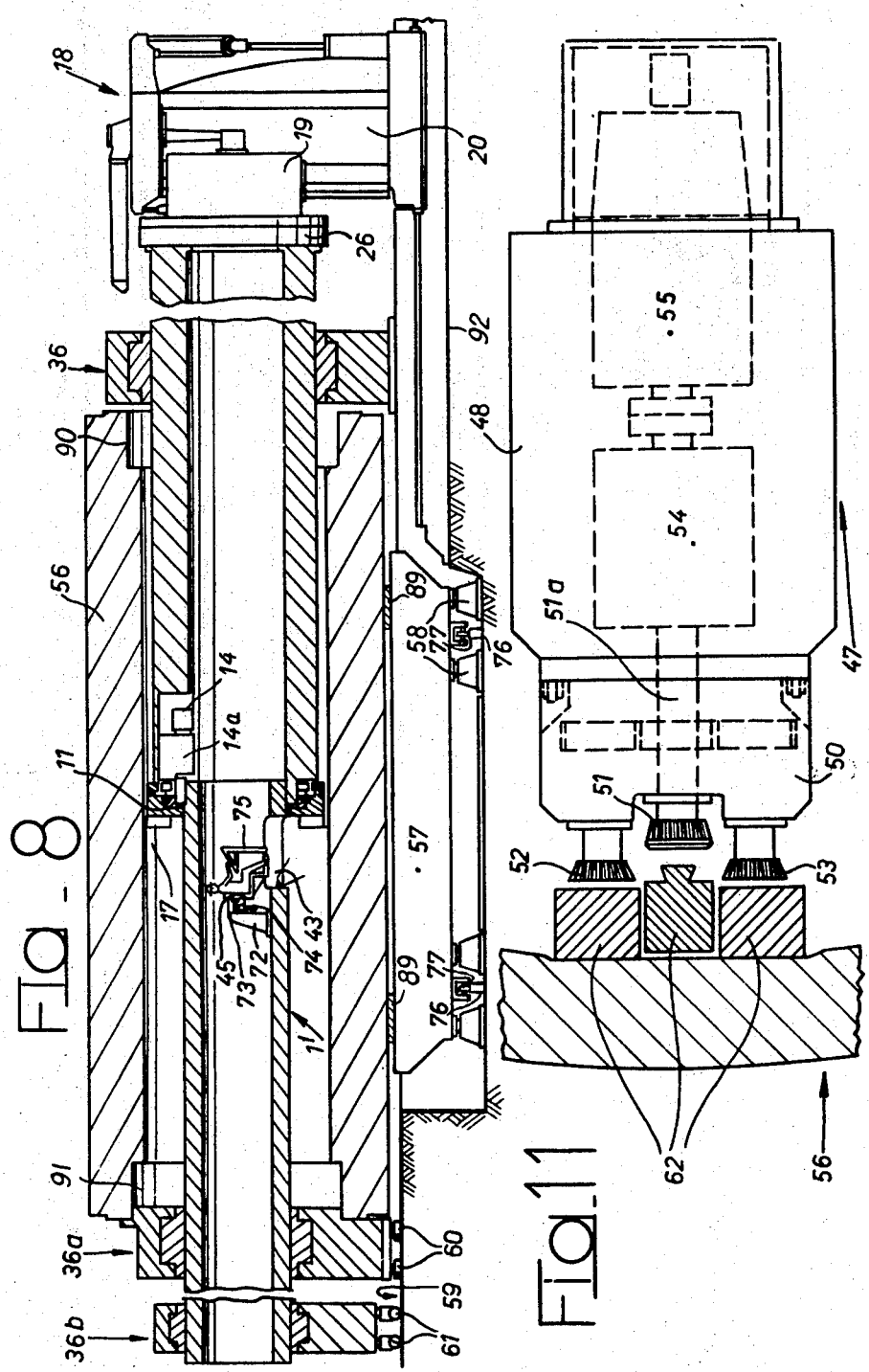

INTERNAL MACHINING OF LARGE HOLLOW CYLINDRICAL WORKPIECES

The invention relates to the machining of large-diameter hollow cylindrical workpieces.

The invention has particular application to the machining of large-size components for use in, for example, electrical power stations. Such power stations tend to employ increasingly powerful generating units, which, therefore, are increasingly large in size. Components of such units are difficult to machine, a particular problem being the internal machining of stator casings which are mostly welded structure of tubular shape and which may reach over 15 meters in length with bores of up to 4 meters.

A particular problem concerns the internal reaming of stator casings for securing positioning bars for magnetic stator circuits, and the machining on such bars of slotted keyways extending parallel to the axis of the casing for the attachment of magnetic laminations having portions of dovetail shape.

Internal machining of such large size workpieces cannot be carried out on conventional machine tools.

The present invention affords a solution to those problems by providing a method of internally machining a large-diameter hollow cylindrical workpiece in which the workpiece is supported with its axis horizontal and a machining tool is supported inside the workpiece on at least one tubular member which extends coaxially within the workpiece and is itself supported externally of the workpiece, for axial movement and/or rotation about its axis under control of a rotary headstock connected to one end of the tubular member.

The invention also provides a machining device attached to a rotatable headstock having a horizontal axis of rotation, an object of the invention being to permit reaming or milling of large size workpieces with a high degree of accuracy.

Accordingly the machining device of the invention comprises a tubular member adapted to extend coaxially within a large-diameter hollow cylindrical workpiece to be machined and provided at one end with means for connection to said headstock externally of the workpiece, tool holder means mounted on the tubular member for supporting a tool in machining engagement with the internal surface of the workpiece, and at least one support in which the tubular member is supported for axial movement and/or rotation about its axis under control of the headstock.

The device according to the invention is simple and sturdy in construction, easy to assemble and convenient to use, so that a number of machining operations, such as those referred to above, may be carried out with a reduced number of workpiece handling operations.

Further characteristic features of the invention will be understood from the following detailed description, given by way of example only, with reference to the accompanying drawings, wherein:

FIG. 1 is an axial sectional view of a machining device according to one embodiment of the invention;

FIG. 2 is a cross-sectional view on line II–II of FIG. 1;

FIG. 3 is a cross-sectional view on line III–III of FIG. 1;

FIG. 4 is a side elevational view of a reaming-milling machine cooperating with the device according to the invention;

FIG. 5 is a front elevation of the machine from the direction of arrow V of FIG. 4;

FIG. 8 is a part-sectional diagrammatical side view of a device of the kind shown in FIGS. 1 to 7 shown in use for internal reaming of a workpiece;

FIG. 11 is a diagrammatical elevation in a direction parallel to the axis of a workpiece of a milling unit for use on the device according to the invention.

Figure 7:
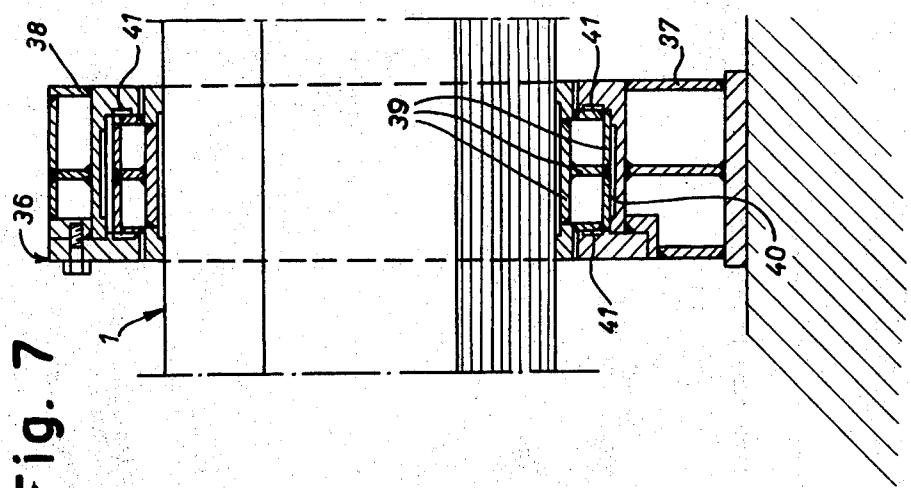
FIG. 7 is an axial sectional view on line VII–VII of FIG. 6.

The machining device according to the invention comprises one or more hollow tubular members adapted to be mounted coaxially within a hollow cylindrical workpiece.

In order to carry out internal reaming and/or milling operations on very long hollow cylindrical workpieces such as stators, two tubular members 1, 1' differing in diameter, with the smaller diameter member 1' fitted coaxially into the end of the larger diameter member 1, are employed as shown in FIG. 1.

Each tubular member 1 (1') comprises outer walls 2 (2') of polygonal cross section (FIGS. 2 and 3) and internal walls 3 (3') of circular cross section spaced from the outer walls and connected thereto by radial and longitudinal reinforcing members 4 (4') and 5 (5'), respectively, disposed respectively in planes perpendicular to and planes containing the axis of the respective tubular member 1 (1'). The faces of the outer walls 2 (2') are machined to form along each longitudinally extending edge a slideway 2a (2'a).

The interiors of the two tubular members 1 (1') are accessible to operators.

The larger tubular member 1 carries at one end means for connection to headstock of a reaming milling machine having a horizontal axis of rotation, with which the machining device cooperates. At its other end the larger tubular member 1 carries a connecter ring 6 connected to a circular plate 7 which is secured by axially extending bolts 9 to a corresponding connecter ring 8 carried by the smaller tubular member 1'.

The ring 6 of the larger tubular member 1 supports through the interposition of a crossed roller bearing 10 a rotatable annular member 11 provided with an internal ring gear 12 which meshes with a pinion 13 driven by a motor 14 through a reduction gearbox 14a. The annular member 11, which is rotatable about the common axis of the tubular members 1, 1', supports at least one slide 15 which is radially movable by means of driving screws 16 and which supports a respective tool holder carriage 17 on which a reaming tool (not shown) may be mounted.

The reaming-milling machine with which the machining device cooperates is shown at 18 in FIG. 8, and shown in further detail in FIGS. 4 and 5. The machine 18 comprises a body 19 slidably mounted on a vertical standard 20 which is in turn horizontally movable along slideways 25 provided on a machine bed 92.

The body 19 supports a rotatable headstock comprising a platform 26 rotatably driven about its axis by a main motor 21. An auxiliary motor 21a is provided for effecting positioning displacements of the headstock platform 26 about its axis and also for effecting displacements of the body 19 along the standard 20.

A counterbalancing support comprising cables 22 and an oleodynamic piston and cylinder 23, 24 balances the weight of the body 19 and the headstock platform 26.

The platform 26 is provided on its forward face with a transverse diametrically extending ridge 27 engaging on assembly a diametrically extending slot 28a (FIG. 1) in an end plate plate 28 which is secured to the adjacent end of the larger tubular member 1. The plate 28 is alined with the rotatable platform by means of a central axially extending dowel 29, which is hydraulically operated and ensures a coaxial relationship of the tubular member 1 and the platform 26. A plurality of screw threaded axially extending bolts 30 are carried by the plate 28 and have enlarged heads which are engaged in T-shaped grooves 31 in the platform. The bolts 30 are tensioned by locking devices comprising an association with each bolt 30 a double lever 32 pivoted at 33 to the end plate 28, and engaged at its end remote from the bolt 30 by a radially movable wedge 34 which is movable by a fluid pressure actuator 35.

Figure 6:
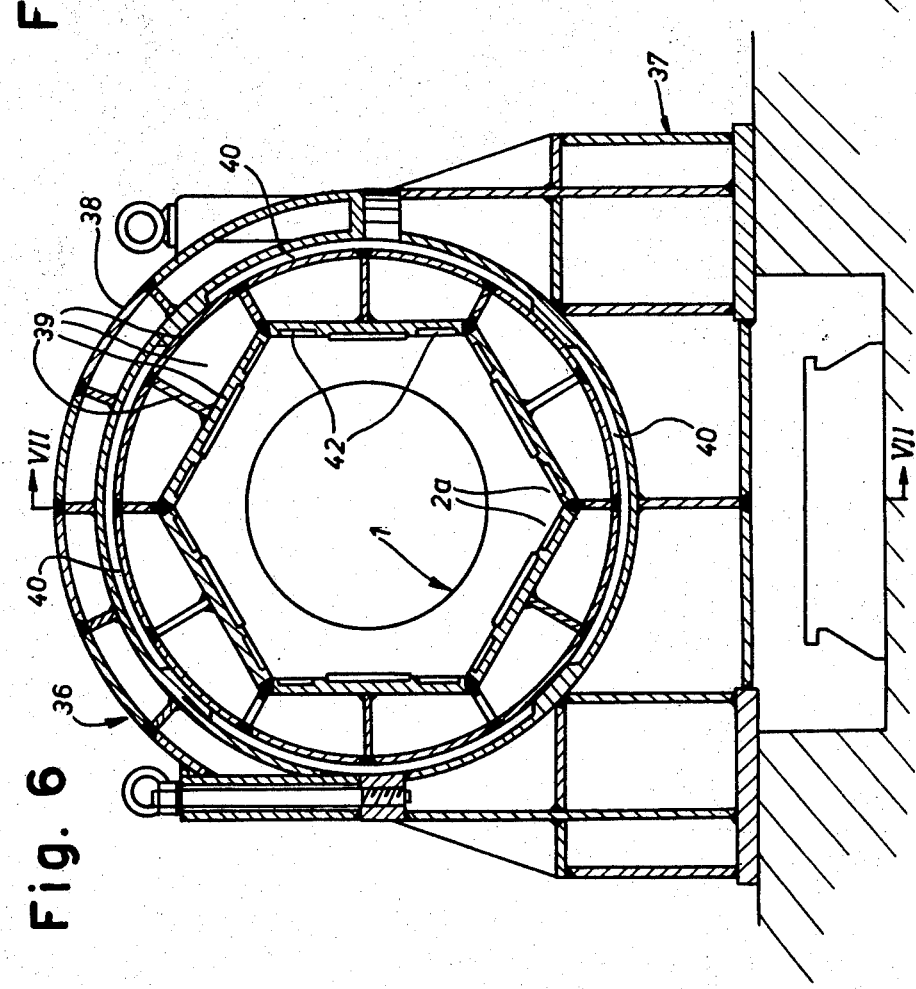
FIG. 6 is a diagrammatical cross-sectional view of one support for the device.

The tubular members 1, 1' are supported by a plurality of supports 36, all similar to one another in structure, one of which is shown in FIGS. 6 and 7. Each support 36 comprises a cradle structure formed by a lower welded frame 37 and an upper welded frame 38 interconnected by screw threaded bolts and defining a circular recess receiving an annular bearing member 39 freely rotatable in the cradle structure on a hydrostatic suspension system. The hydrostatic suspension system comprises a plurality of chambers 40 and 41 in radially and axially facing surfaces respectively of the cradle structure, said chambers 40, 41 being supplied with hydrostatic fluid under pressure from a source S to provide radial and axial support respectively.

The annular bearing member 39 has an internal wall of polygonal cross section matching the external shape of the respective tubular member 1, 1'. The tubular member 1, 1' is slidable axially in the bearing member 39 and is guided by the respective slideways 2a, 2a'. The tubular member 1, 1' is supported by a system of pressure chambers 42 defined between the facing surfaces of the bearing member 39 and the tubular member 1, 1' and supplied with hydrostatic fluid at a controlled pressure. Consequently, each tubular member 1, 1' is free to slide axially and rotate within its support 36, in response to positioning movements of the rotatable headstock platform 26, that is, both rotation of the latter about its axis and translational movement of the reaming-milling machine 18 along the machine bed slideways 25.

The smaller tubular member 1', is formed with a plurality of lateral access openings 43 adapted to be closed by shaped removable covers 44 which conform to the external shape of the tubular member.

A supervising and/or control position is installed near the said openings 43 and comprises a swing seat 45 for an operator equipped with lighting, operating and control means 75 as well as with a protection for the operator himself. The seat 45 is rotatable about the axis of the tubular member 1' and in upright position even during rotation of the tubular members 1 1'. Support 72 is secured to the tubular member 1 or 1' and positions the operator's seat 45 through the pivotal mounting 73. The seat 45 and control means 75 are suspended in such a manner from support 72 so that their center of gravity is beneath the axis of the tubular member 1 or 1' even when the operator is present. This positioning of the center of gravity maintains the seat 45 and control means 75 in an upright position during rotation.

Figure 12:
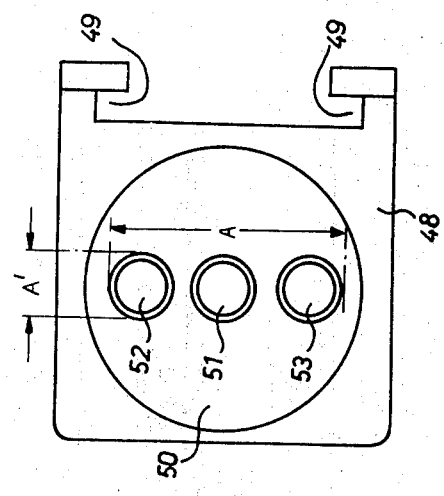
FIG. 12 is an end view in a radially inward direction of the milling unit shown in FIG. 11.

A milling unit 47 may be fitted to the rotatable annular member 11 of the larger tubular member 1 instead of reaming tools, and is secured to the said member 11 by means of a bell crank strap 46 (FIG. 9) mounted on a radially extending slideway 15a on which the strap 46 is adjustable. The unit 47 comprises, as shown in FIGS. 11 and 12, a supporting bedplate 48 formed with grooves 49 for engaging the radial slideway 15a. The bedplate 48 accommodates internally a driving motor 55 and a reduction gearbox 54 shown in broken outline for simultaneous drive of a set of three milling cutters 51, 52 and 53 rotatable about parallel radially extending axes and carried by a milling head 50 which is rotatable about an axis coinciding with the axis 51a of the middle milling cutter 51.

Rotation of the milling head 50 about the axis 51a permits variation in the position of the two outer milling cutters 52, 53 in order to adjust the overall width of the region to be milled between a maximum width A and a minimum width A', as shown in FIG. 12. The milling unit 47 is used for milling stator casing 56.

As shown in FIG. 8, the device according to the invention may be employed for carrying out internal reaming of a large stator casing 56 which is mounted on conventional cradles 89 on a support table 57 adjacent a machine bed and rotatable about a vertical axis for proper alinement of the workpiece and provided with bottom positioning and locking rams 58. Any conventional means for rotating the supporting table may be used such as conventional rails 76 support motor driven rollers 77 to permit the support table 57 to be rotated and thereby permit workpieces to be placed onto the support table from various angles. Two fixed supports 36, 36a are provided outwardly of both ends of the stator 56 for rotatably and slidably supporting the larger and smaller tubular members 1, 1' respectively. The smaller tubular member 1' is additionally supported at its free end by a further support 36b mounted on wheels 61 and movable over a horizontal surface 59 with which one of the fixed supports 36a is engaged through the interposition of adjusting dowels 60.

Figure 9:
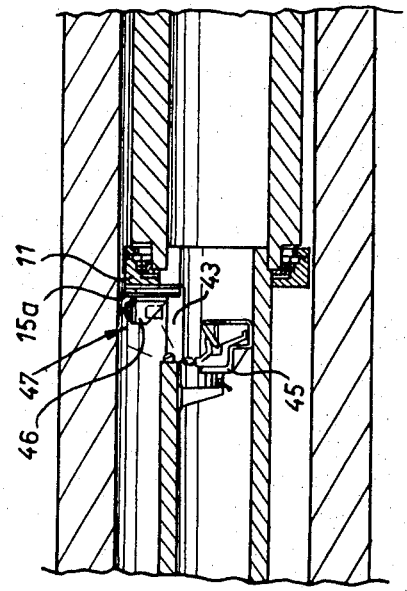
FIG. 9 is a view similar to FIG. 8 showing a portion of the device in use for internal milling of a workpiece.

With the device according to the invention the internal surface of a stator casing 56, whatever its length, may be internally reamed, FIG. 8, and milled, FIG. 9, after machining in a known manner the two end portions 90, 91 of the stator casing, placing the workpiece on the supporting table 57 and alining it coaxially with the tubular members 1, 1', which are retracted during setting up and then extended coaxially into the workpiece by movement of the headstock on the machine bed to allow machining to commence.

Figure 10:
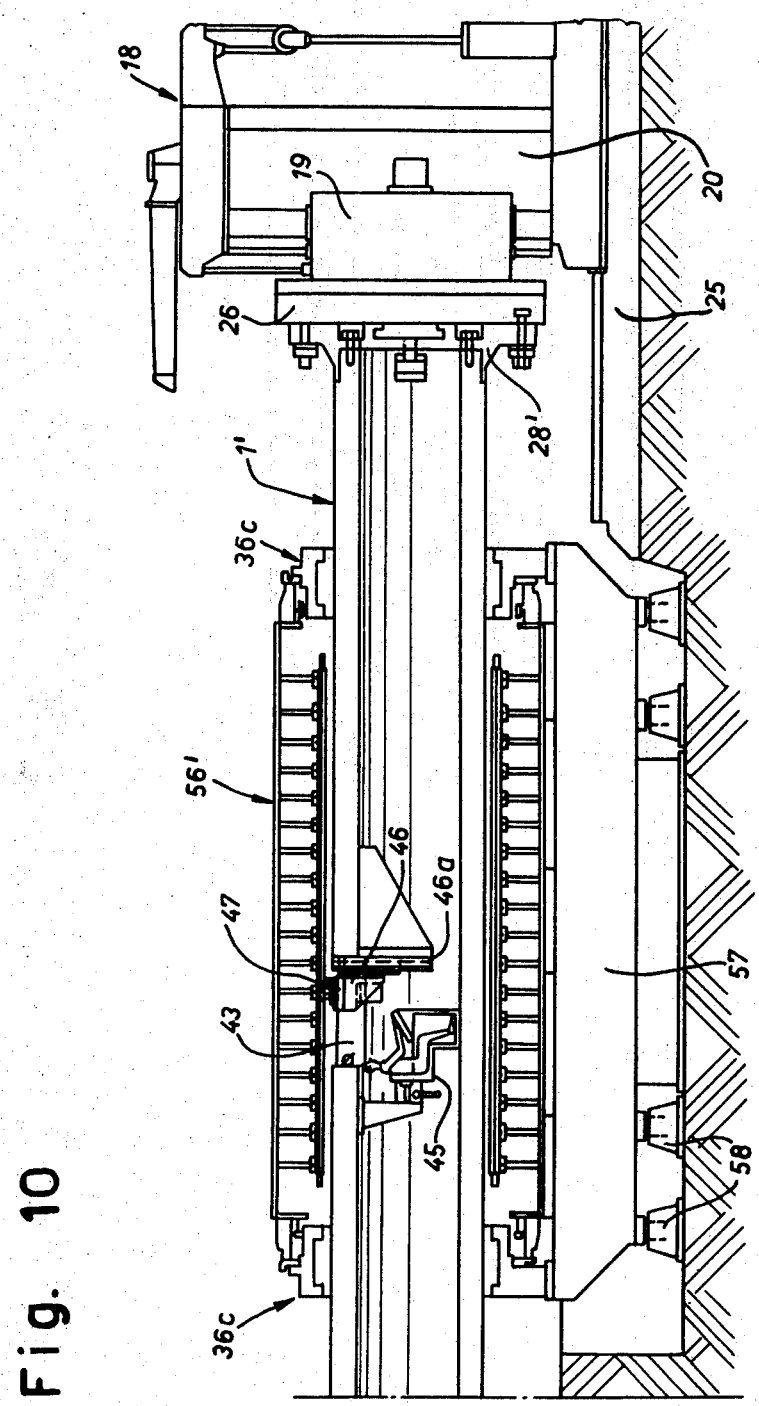
FIG. 10 is a part sectional diagrammatical side view of a machining device according to another embodiment of the invention, shown in use for internally milling a workpiece.

In order to machine stator casings 56' of smaller length, it will be sufficient to employ a machining device comprising a smaller tubular member 1' alone, as shown in FIG. 10, which is directly attached to the rotatable headstock platform 26 of a milling-reaming machine 18 through a plate 28' similar to the plate 28 employed in the embodiment of FIGS. 1 to 9. The tubular member 1' is supported by a pair of supports 36c arranged outwardly of both ends of the stator casing 56' to be machined, the latter resting on a support table 57 which is rotatable about a vertical axis and lockable by means of positioning rams 58.

The device of FIG. 10 enables milling to be carried out by means of milling unit 47 supported by a strap 46 adjustable radially on a slideway 46a. Owing to the small size of the stator casing 56' reaming can be effected only by providing tubular extensions directly on the headstock platform 26.

It will be understood that many constructional details of the invention may be varied with respect to that specifically described without departing from the scope of this invention as defined in the appended claims.

We claim:

1. A method of internally machining a large-diameter hollow cylindrical workpiece comprising the steps of:

supporting the workpiece with its axis horizontal;

providing at least one tubular member having a closable opening which extends coaxially within the workpiece and is itself supported externally of the workpiece;

supporting a machining tool on the tubular member inside the workpiece;

connecting a rotary headstock to one end of the tubular member for rotating the tubular member and moving it axially as required;

attaching a pivotably mounted control means and seat inside the tubular member adjacent the opening;

rotating the tubular member; and counterrotating the control means and seat relative to the tubular member to provide a relative stationary position for observing and controlling the machining of the workpiece.

2. A machining device for machining a large-diameter hollow cylindrical workpiece, said device comprising a tubular member adapted to extend substantially centrally within the cylindrical workpiece; a headstock; means for moving the headstock in an axial and rotational direction; means at one end of the tubular member for connection to the headstock externally of the workpiece; tool holder means mounted on the tubular member for supporting a tool in machining engagement with the internal surface of the workpiece; at least one support for supporting the tubular member during axial and rotational movement; a central means provided within the tubular member for machining the workpiece and a rotatable seat means for supporting an operator of the control means within the tubular member in a stationary upright position during rotation of the tubular means.

3. A machining device for machining a large-diameter hollow cylindrical workpiece, said device comprising a tubular member adapted to extend substantially centrally within the cylindrical workpiece; a headstock; means for moving the headstock in an axial and rotational direction; means at one end of the tubular member for connection to the headstock externally of the workpiece; tool holder means mounted on the tubular member for supporting a tool in machining engagement with the internal surface of the workpiece; at least one support for supporting the tubular member during axial and rotational movement; the headstock has a transversely extending ridge and the means for connecting the tubular member to the rotatable headstock comprise a plate secured to the tubular member at said one end and having a transverse diametrically extending slot adapted to make a driving connection with the transversely extending ridge provided on the headstock, the plate is further provided with a plurality of axially extending bolts, respective double levers pivoted to the plate and engaging the bolts at one end, respective wedge members engaging the other ends of the respective levers, and fluid pressure actuators connected to the respective wedge members and operative to cause translational movement thereof to tension the respective bolts through the respective levers.

4. A machining device for machining a large-diameter hollow cylindrical workpiece, said device comprising a tubular member adapted to extend substantially centrally within the cylindrical workpiece; a headstock; means for moving the headstock in an axial and rotational direction; means at one end of the tubular member for connection to the headstock externally of the workpiece; tool holder means mounted on the tubular member for supporting a tool in machining engagement with the internal surface of the workpiece; at least one support for supporting the tubular member during axial and rotational movement; the tool holder means further comprising an annular member rotatably mounted at the end of the tubular member remote from said one end, at least one radially displaceable tool supporting slide, supported on the annular member and driving means for rotating the annular member about the axis of the tubular member.

5. A device as claimed in claim 4 in which said driving means comprise a motor mounted on the tubular member, a toothed pinion drivingly connected to the motor, and an internal ring gear provided on the annular member and meshing with said pinion.

b. A machining device for machining a large-diameter hollow cylindrical workpiece, said device comprising a tubular member adapted to extend substantially centrally within the cylindrical workpiece; a headstock; means for moving the headstock in an axial and rotational direction; means at one end of the tubular member for connection to the headstock externally of the workpiece, tool holder means mounted on the tubular member for supporting a tool in machining engagement with the internal surface of the workpiece; at least one support for supporting the tubular member during axial and rotational movement; and another tubular member of smaller diameter than the first tubular member capable of supporting tool holder means, mounted coaxially within the first tubular member at the end thereof remote from the headstock end.

7. A machining device for machining a large-diameter hollow cylindrical workpiece, said device comprising a tubular member adapted to extend substantially centrally within the cylindrical workpiece; a headstock; means for moving the headstock in an axial and rotational direction; means at one end of the tubular member for connection to the headstock externally of the workpiece; tool holder means mounted on the tubular member for supporting a tool in machining engagement with the internal surface of the workpiece; at least one support for supporting the tubular member during axial and rotational movement; the tubular member comprises an external metal wall of polygonal cross section, an internal metal wall of circular cross section coaxial with and spaced from the external wall, and radial and longitudinal reinforcing members disposed respectively in planes perpendicular to and planes containing the axis of the tubular member, and interconnecting the external and internal walls.

8. A device as claimed in claim 7 in which the outer polygonal-section wall has longitudinal edges provided with slideways adapted to cooperate with said support to facilitate axial sliding movement of the tubular member.

9. A device according to claim 2 in which said tubular member is provided with means defining at least one lateral access opening having a removable cover which conforms to the external shape of the tubular member.

10. A device as claimed in claim 9 comprising a single tubular member provided with attachment means for a milling machine near said access opening.

11. A machining device for machining a large-diameter hollow cylindrical workpiece, said device comprising a tubular member adapted to extend substantially centrally within the cylindrical workpiece; a headstock; means for moving the headstock in an axial and rotational direction; means at one end of the tubular member for connection to the headstock externally of the workpiece; tool holder means mounted on the tubular member for supporting a tool in machining engagement with the internal surface of the workpiece; at least one support for supporting the tubular member during axial and rotational movement; the support comprises an annular bearing member, cradle structure, fluid pressure suspension means supporting the bearing member from the structure and permitting rotation of the bearing member about its axis, and further fluid pressure suspension means supporting the tubular member from the bearing member and permitting relative axial movement of the tubular member.

12. A device as claimed in claim 11 in which the bearing member and cradle structure have both radially and axially facing surfaces, and the fluid pressure suspension means for supporting the bearing member from the cradle structure comprises means defining a plurality of pressure chambers between both the radially and axially facing surfaces of the bearing member and the cradle structure, and means supplying fluid under pressure to said chambers to support the bearing member both radially and axially.

13. A machining device for machining a large-diameter hollow cylindrical workpiece, said device comprising a tubular member adapted to extend substantially centrally within the cylindrical workpiece; a headstock; means for moving the headstock in an axial and rotational direction; means at one end of the tubular member for connection to the headstock externally of the workpiece; tool holder means mounted on the tubular member for supporting a tool in machining engagement with the internal surface of the workpiece; at least one fixed support for supporting the tubular member during axial and rotational movement; and one movable support which is provided with wheels and movable axially with the tubular member to follow axial displacements thereof.

14. A machining device for machining a large-diameter hollow cylindrical workpiece; said device comprising a tubular member adapted to extend substantially centrally within the cylindrical workpiece; a headstock; means for moving the headstock in an axial and rotational direction; means at one end of the tubular member for connection to the headstock externally of the workpiece; tool holder means mounted on the tubular member for supporting a tool in machining engagement with the internal surface of the workpiece; at least one support for supporting the tubular member during axial and rotational movement; the tool holder means include radially movable slides, and a milling unit supported on the slides, the milling unit comprising a milling head, a plurality of milling cutters rotatable about parallel axes in the head, and means for rotating the head about a radially extending axis to vary the width of the area milled by the cutters.

15. A device for machining a large-diameter hollow cylindrical workpiece, the device comprising a machine bed, a headstock, means to rotate the headstock and move it horizontally, the headstock mounted for rotational movement and axial movement horizontally along the machine bed, a supporting table adjacent the machine bed, the supporting table being adapted to carry a workpiece whose axis is coincident with that of the headstock, a tubular member adapted to extend substantially centrally within the workpiece and being provided with an aperture means at one end of the tubular member connecting it to the headstock externally of the workpiece, tool holder means mounted on the tubular member for supporting a tool in machining engagement with the internal surface of the workpiece, a seat for an operator located in the aperture of the tubular member, means mounting the seat to cause it to remain upright despite rotation of the tubular member, and at least one support holding the tubular member against lateral movement permitting axial and rotational movement of the tubular member in response to axial and rotational movement of the headstock.